United States Patent [19]

Weber

[11] 3,909,749

[45] Sept. 30, 1975

[54] OPTICAL TRANSMISSION EMPLOYING MODULATION TRANSFER TO A NEW CARRIER BY TWO-PHOTON ABSORPTION

[75] Inventor: Heinz Paul Weber, Middletown, N.J.

[73] Assignee: Bell Telephone Laboratories, Incorporated, Murray Hill, N.J.

[22] Filed: May 12, 1971

[21] Appl. No.: 142,680

[52] U.S. Cl. ............... 332/7.51; 250/199; 350/96 R

[51] Int. Cl.² ............................................ H01S 3/00

[58] Field of Search ................... 250/199; 307/88.3; 332/7.51; 331/94.5; 350/96

[56] References Cited

UNITED STATES PATENTS

| | | | |
|---|---|---|---|
| 3,175,088 | 3/1965 | Herriott | 250/199 |
| 3,233,108 | 2/1966 | Rosenblum | 250/199 |
| 3,555,455 | 1/1971 | Paine | 250/199 X |
| 3,584,230 | 6/1971 | Tien | 332/7.51 |
| 3,610,932 | 10/1971 | Morse et al. | 250/199 |
| 3,633,034 | 1/1972 | Uchida et al. | 250/199 |

*Primary Examiner*—Maynard R. Wilbur
*Assistant Examiner*—S. C. Buczinski
*Attorney, Agent, or Firm*—Wilford L. Wisner

[57] ABSTRACT

There is disclosed apparatus for transmission of modulated optical beams in which the modulation is transferred to another optical beam of different frequency by two-photon absorption at the sum of the two optical frequencies. The two-photon absorber is included in or disposed in contact with a fiber optical guide or a thin-film transmission medium.

11 Claims, 2 Drawing Figures

INVENTOR
H. P. WEBER
BY
ATTORNEY

OPTICAL TRANSMISSION EMPLOYING MODULATION TRANSFER TO A NEW CARRIER BY TWO-PHOTON ABSORPTION

BACKGROUND OF THE INVENTION

This invention relates to apparatus for transferring modulation from one light beam to another.

The feasibility of optical communication depends in large measure on the ability to modulate light beams of frequency that can be transmitted with low loss. Unfortunately, in many instances the light frequencies that are most easily modulated are not necessarily the best for efficient transmission. It thus becomes desirable to be able to transfer the modulation from a first, easily modulated light beam to another light beam that is more desirable in some respects for transmission.

Several techniques have been proposed for transferring modulation from one light beam to another. In concept, the simplest scheme is to direct the modulation on the first light beam by demodulating it and then to use the resultant output signal to modulate the new light signal. While this may be desirable in repeaters for optical communication links to avoid echoes and spurious feedback that might produce unwanted oscillation, it does not resolve the problem that the second light beam is typically one which is difficult to modulate by available techniques. Alternatively, transfer of modulation without demodulation can be achieved by optical parametric mixing; but then phase-matching of three waves in the nonlinear medium is usually needed to achieve a usable output. In another scheme, modulation is transferred from an optical beam to a lower frequency, longer wavelength beam by carrier injection in a semiconductor. Nevertheless, it is frequently desirable to shift carrier frequencies in the opposite direction, namely, to higher frequencies; and it would be desirable to do so without any requirements for phase-matching.

SUMMARY OF THE INVENTION

According to my invention, modulation transfer is achieved by two-photon absorption at the sum of the frequencies of the first and second light beams. This process is not limited in modulation bandwidth by the characteristics of either detectors or modulators.

According to a feature of my invention, the required power densities for the two-photon absorption process are achieved by directing the modulated and unmodulated optical beams collinearly through a two-photon absorbing optical fiber or a two-photon absorbing, lightguiding thin film.

Advantageously, phase-matching plays no role in my invention; and the two-photon absorbing medium may be polycrystalline, glassy or liquid.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENTS

Figure 1:
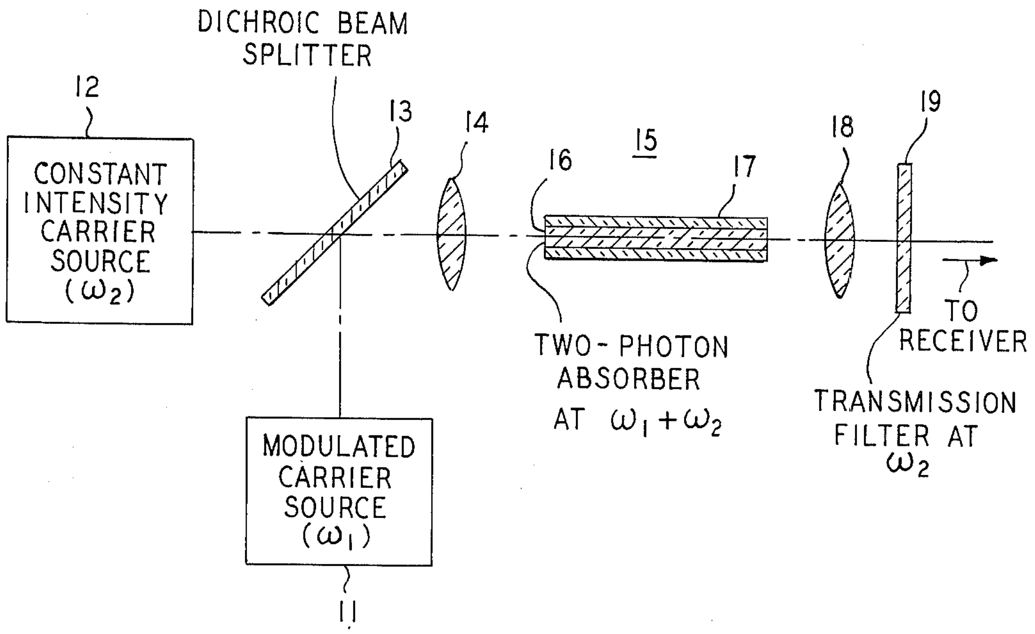
FIG. 1 is a partially pictorial and partially block diagrammatic illustration of an optical fiber embodiment of my invention.

In the embodiment of FIG. 1 it is desired to transfer the modulation carried by an optical beam from the carrier source 11 having a carrier frequency $\omega_1$ to a constant intensity optical beam at the higher frequency $\omega_2$, which is supplied by source 12. The two beams are combined by the dichroic beam splitter 13 of known type and focused by lens 14 into the end of the two-photon absorbing fiber 16. Although the two-photon absorption process, which is to be achieved at the sum frequency $\omega_1 + \omega_2$, requires relatively high power density of at least one of the two beams, this density can be achieved in the fiber 16 with relatively low absolute powers from sources 11 and 12, for example, powers of the order of 30 milliwatts.

To give the fiber 16 strength and mechanical supportability, it is coated with a low-loss cladding 17 of substantially lower index of refraction than fiber 16.

The typically divergent output from the output end of fiber 16 is refocused by a lens 18 and filtered by transmission filter 19 which passes only the optical beam at frequency $\omega_2$. This beam carries the modulation formerly carried by the optical beam at frequency $\omega_1$.

In operation, a modulation transfer process occurs in fiber 16; this can be more exactly and mathematically described as follows: Assume $I_1(\omega_1)$ to be the incoming modulated signal of intensity $I_1$ and frequency $\omega_1$. It can be written as $$I_1(\omega_1) = f_1(t)\cdot \bar{I}_1(\omega_1)\ , \qquad (1)$$

where $f_1(t)$ is the modulation content and $\bar{I}_1(\omega_1)$ is the mean intensity. It is assumed here that $2\hbar\omega_1 < \delta E$, the energy gap of the two-photon absorber. Thus the beam at frequency $\omega_1$ passes without attenuation originating from two-photon absorption through the absorber. Beam $I_2(\omega_2)$ is of lower intensity than $I_1(\omega_1)$ and is of constant intensity $I_2 = \bar{I}_2$. Also, $\omega_2$ is such that $\hbar(\omega_1+\omega_2) > \delta E$. Then beam $I_2$ gets attenuated according to $$\frac{dI_2}{dz} = -\beta\, I_2 \cdot I_1, \qquad (2)$$

where $\beta$ is the two-photon absorption coefficient. For beam $I_2$, this absorption is equivalent to a linear absorption with absorption coefficient $\beta I_1$. Thus, the modulation $f_1(t)$ becomes transferred to $I_2$. We obtain with $z$ as absorption pathlength $$I_2' = \bar{I}_2 e^{-\beta I_1 z} = \bar{I}_2(1-\beta I_1 z - \ldots)$$
$$= \bar{I}_2\,(1-\beta z \bar{I}_1 f(t) + \ldots) \qquad (3)$$

One notes that the transfer is only linear in the first approximation. This is inconvenient for the transfer of an analog modulation. However, for a pulse code modulation it is still useful. In the following, let us assume that the signal $I_1$ is an on-off modulated beam. Then a 100 percent modulation of $I_2$ is possible in the limit of high intensity $i\ I_1$.

It is of interest to learn what values of the term $\beta z I$ may be expected. According to V. V. Arsenev et al, *Soviet Physics JETP* 29 (3), 413, September, 1969, the two-photon absorption coefficient $\beta$ takes the following values for the following materials:

| | | |
|---|---|---|
| SiC | 0.2 | cm/MW |
| $CdS_{0.8}Se_{0.2}$ | 0.13 | cm/MW |
| GaAs | 0.8 | cm/MW. |

Consequently, for an absorption pathlength $z$ of 1 centimeter, one would need power densities of $\bar{I}_1$ in the range of 1 $MW/cm^2$. The numbers become promising if one assumes a sufficiently small transverse dimension of the guided beam, e.g., that the process takes place in the cladded glass fiber 16. A 2 micrometer diameter of the guided beam corresponds to $3 \times 10^{-6}mm^2$ and consequently the power is 30mW. Damage of the material should be unlikely because the high power density beam is not absorbed significantly. The response time of the two-photon absorption process is the reciprocal of the width of the absorption band. The dispersion of the material sets the upper limitation to the modulation bandwidth. Although the new signal carrier $I_2$ is of lower intensity than $I_1$, this modulation transfer may still be of practical interest, because $I_2$is of a different frequency, that may be less attenuated in propagation or the available detectors are more sensitive at this wavelength. Moreover, subsequent amplification at frequency $\omega_2$ can be supplied.

The discussed example, where $\omega_1 < \omega_2$ and $I_1 > I_2$ and the absorption band is assumed to be a continuum, is only a special case of a whole set of possibilities. If we assume, for example, that $\omega_1 < \omega_2$, $I_1/\omega_1 < I_2/\ \omega_2$ and the absorption band is limited, so that $(\omega_1+\omega_2)$ may be absorbed, but $2\omega_1$ as well as $2\omega_2$ are outside of the two-photon absorption range, we get an entirely different solution. The differential equation is the same but $I_1$ gets significantly attenuated. Because every absorption process takes a photon out of beam $I_1$ and $I_2$ simultaneously, the loss for beam $I_2$ amounts in the limit of maximum absorption to the same number of photons that were present in $I_1$. This corresponds to a transfer of 100 percent pulse modulation that is superimposed on a constant intensity signal. The intensity of the pulse modulation $I_2^{AC}$ is according to the different energies of the absorbed quanta $$I_2^{AC} = I_1 \frac{\omega_2}{\omega_1} \qquad (4)$$

which is higher than the original intensity.

The two results are that we can get a total modulation of a weak beam $I_2$, or that we can transfer the full AC modulation (pulse modulation) of one beam to a stronger beam. These two typical results occur for all combinations of possibilities for frequencies $\omega_1 \lesseqgtr \omega_2$ and intensities $I_1/\omega_1 \lesseqgtr I_2/\omega_2$. The results are compiled in Table I, set forth below.

TABLE I

Transfer of PCM Signal by TPA for Strong Interaction

| | $I_2$-constant intensity beam at $\omega_2$<br>$I_1$-original signal at $\omega_1$ | - differential equation for modulation transfer<br>absorption band without upper limit | - resulting modulation of signal $I_2'$<br>absorption band with upper limit |
|---|---|---|---|
| $\omega_1 < \omega_2$ | $I_1/\omega_1<I_2/\omega_2$ | $dI_2 \sim -I_2(I_1+I_2)dz$<br>$I_2'$ is strongly absorbed and gets washed out | $dI_2 \sim I_2I_1dz$<br>100% AC mod, $I_2^{ac} = I_1 \cdot \omega_2/\omega_1$ |
| | $I_1/\omega_1>I_2/\omega_2$ | $dI_2 \sim -_{I2}I_1dz$<br>100% modulation, $I_2'$ weak | $dI_2 \sim -_{I2}I_1dz$<br>100% modulation, $I_2'$ weak |
| $\omega_1 > \omega_2$ | $I_1/\omega_1<I_2/\omega_2$ | $dI_2 \sim -_{I1}I_2dz$<br>100% AC mod, $I_2^{ac} = I_1\omega_2/\omega_1$ | $dI_2 \sim -_{I1}I_2dz$<br>100% AC mod, $I_2^{ac} = I_1\ \omega_2/\omega_1$ |
| | $I_1/107\ _1>I_2\omega_2$ | $dI_2 \sim -I_1I_2dz$, signal not clean transmitted as<br>$dI_1 \sim I_1(I_1+I_2)$ and $I_2'$ weak | $dI_2 \sim -I_1I_2dz$<br>100% modulation, $I_2'$ weak |

These results may be compared with optical up-conversion and down-conversion, making use of the real part of the optical nonlinearity. Compared with these processes, two-photon absorption has the disadvantage that it is an absorbing process but, on the other hand, there is the important advantage that there is no phase-matching needed and there is no critical dependence on temperature as in a phase-matching process.

The only basic limitation on modulation bandwidth for the process employed in the apparatus of FIG. 1 is given by the dispersion of the optical components and is in the range of $1 \times 10^{12}$ Hertz.

The following specific examples of materials and frequencies are suggested as desirable and presently preferred for use in the embodiment of FIG. 1:

EXAMPLE 1

In this example, an optical fiber 16 is illustratively cadmium sulphide and of 2 micrometer diameter and the cladding 17 is a low-loss optical glass of substantially greater thickness than the fiber 16 itself. The wavelength $\lambda_1$ of the beam from source 11 is illustratively 1.06 micrometers and is supplied by a neodymium ion yttrium aluminum garnet host laser within source 11. This laser is illustratively mode locked and the resulting train of pulses is pulse code modulated within source 11. The wavelength $\lambda_2$ of the light beam from source 12 is illustratively 7064 Angstroms and is supplied by a selenium ion laser within source 12. This laser is of the type described in the copending patent application of M. B. Klein and W. T. Silfvast, Ser. No. 68,991, filed Sept. 2, 1970. These beams are supplied at the relative power lasers indicated above for 100 percent modulation of the new frequency $\omega_2$. The illustrative supplied pulse power level from source 11 is 5 watts; and the continuous-wave power supplied from source 12 is 10 milliwatts. The $\omega_2$ beam at the output of filter 19 will bear readily detectable pulse code modulation.

EXAMPLE 2

In this example, the material of fiber 16 is illustratively the dye commonly known as BBOT in its molten state and the cladding 17 is actually a glass capillary tube of index 1.49 and internal diameter is 5 micrometers. The source 11 remains the same as in the previous example and presents the same modulation format. The wavelength $\lambda_2$ of the beam from source 12 is 6328 Angstroms, supplied by a conventional helium-neon laser.

A dye such as BBOT has a weaker two-photon absorption effect than does a semiconductor such as cadmium sulphide; and a length of the fiber of typically 100 centimeters is required. In contrast to a semiconductor, the BBOT in fiber 16 has a relatively narrow absorption band starting above $2\omega_1$, but including $\omega_1+\omega_2$, and stopping short of $2\omega_2$. This modification offers the possibility that the modulation can also be transferred from a strong short wavelength carrier to a weaker long wavelength carrier.

Figure 2:
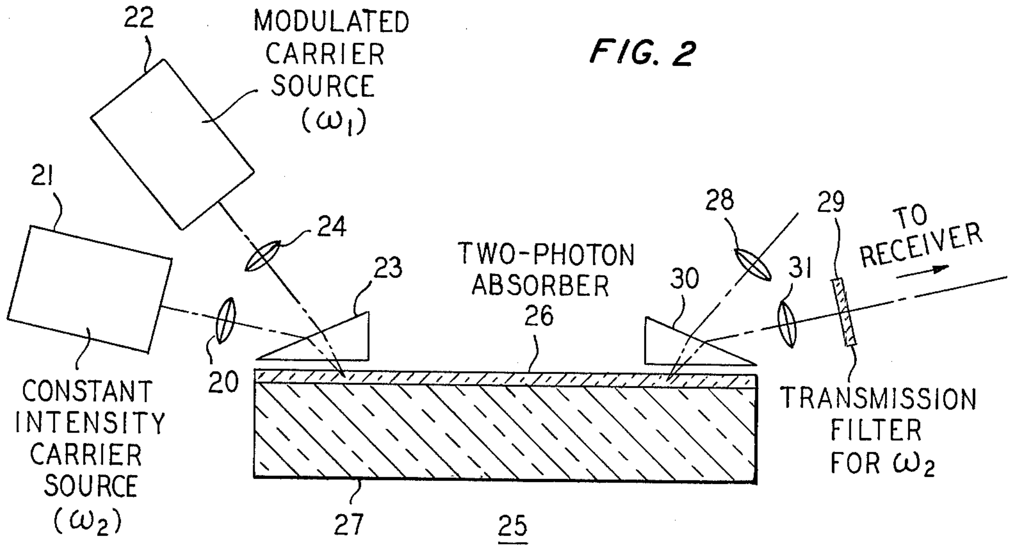
FIG. 2 is a partially pictorial and partially block diagrammatic illustration of a thin-film light guide embodiment of my invention.

The same combinations of input frequencies and two-photon absorbing materials may be used in thin-film embodiments of the invention, which may be of the type shown in FIG. 2.

In FIG. 2, sources 21 and 22 are essentially the same as sources 11 and 12 in FIG. 1. Their outputs are focused by lenses 20 and 24, respectively, into the prism 23 at angles appropriate for phase-matching their components to guided waves of like frequency in thin film 26.

As explained in the copending patent application of P. K. Tien, Ser. No. 793,696, filed Jan. 24, 1969, now allowed, and assigned to the assignee hereof, the prism 23 has a higher refractive index than film 26 and is separated therefrom by a gap occupied by a medium of index lower than either. The gap dimension is of the order of one wavelength for both $\lambda_1$ and $\lambda_2$ in the direction normal to film 26.

The output coupling arrangement includes the prism 30 and lenses 28 and 31 disposed in mirror image positions along the propagation path of the light beams in the thin film 26. Prism 30 is like prism 23 and lenses 28 and 31 are like lenses 24 and 20, respectively. The modulated beam at frequency $\omega_2$ is illustratively passed through a bandpass transmission filter 29 like filter 19 of FIG. 1. Nevertheless, the transmission filter 29 is not required, since the residual beam at frequency $\omega_1$ and the newly-modulated beam at frequency $\omega_2$ are substantially separated in angle because of the differing characteristics of the phase-matched coupling at the two frequencies between thin film 26 and prism 30.

Specific examples of the use of the embodiment of FIG. 2 could be identical with those of the embodiment of FIG. 1, except that somewhat higher supplied light intensities may be desirable.

Nevertheless, thin-film lenses can be supplied within the two-photon absorber 26 in the manner described in the copending patent application of R. J. Martin and R. Ulrich, Ser. No. 835,484, filed June 23, 1969, and assigned to the assignee hereof. In this case, the beams may be nearly as tightly confined as in the guiding fiber 16 of FIG. 1. In that case, no significant increase in supplied light intensities is necessary.

Several modifications of my invention are within its scope. For example, two-photon absorption may be provided in the cladding 17 of FIG. 1 or substrate 27 of FIG. 2, in which case the guide itself can be passive. Two-photon absorption is then provided by sufficient strengths of the evanescent fields of the guided waves outside of the guide in the absorber.

More specifically, in FIG. 2, substrate 27 may be a high-resistivity, two-photon absorbing crystal and film 26 may be a passive thin film.

I claim:

1. In an optical communication system, optical modulation apparatus comprising a source of an intensity modulated optical beam at frequency $\omega_1$, a source of an unmodulated coherent optical beam at a frequency $\omega_2$ not equal to $\omega_1$, means including a body of material having two-photon absorption for respective photons of frequencies $\omega_1$ and $\omega_2$ for generating a photon having a frequency $\omega_3$ which is equal to the sum $\omega_1 + \omega_2$, said body of material having an energy transparency range greater than twice the photon energy of the modulated beam and less than the sum of the photon energies of the modulated and unmodulated beams and having absorption for photons of frequency $\omega_3$, means for directing said beams into said body with coincident intensities sufficient to produce significant two-photon absorption throughout a substantial pathlength in said body, and means for extracting for utilization a resultant intensity modulated beam at frequency $\omega_2$.

2. In an optical communication system, apparatus according to claim 1 in which the body is a fiber of the material, said fiber having transverse dimensions and a low-loss optical environment suitable for optical guiding of the beams at both of said frequencies $\omega_1$ and $\omega_2$.

3. In an optical communication system, apparatus according to claim 1 in which the body is a film of the material and the directing means include means for coupling said beams through a broad surface of said film.

4. An optical communication system according to claim 1 in which the sources of the beams have intensities $I_1$ and $I_2$, respectively, satisfying the relationship $I_1/\omega_1 < I_2/\omega_2$.

5. An optical communication system according to claim 1 in which the sources of the beams have intensities $I_1$ and $I_2$, respectively, satisfying the relationship $I_1/\omega_1 > I_2/\omega_2$.

6. In an optical communication system, optical modulation apparatus comprising a source of an intensity modulated optical beam at frequency $\omega_1$, a source of an unmodulated coherent optical beam at a frequency $\omega_2$ greater than $\omega_1$, means including a body of material having two-photon absorption for respective photons of frequencies $\omega_1$ and $\omega_2$ for generating a photon having a frequency $\omega_3$ which is equal to the sum $\omega_1 + \omega_2$, said body of material having an energy transparency range greater than twice the photon energy of the modulated beam and less than the sum of the photon energies of the modulated and unmodulated beams and having absorption for photons of frequency $\omega_3$, means for directing said beams into said body with coincident intensities sufficient to produce significant two-photon absorption throughout a substantial pathlength in said body, and means for extracting for utilization a resultant intensity modulated beam at frequency $\omega_2$.

7. In an optical communication system, apparatus according to claim 6 in which the body is a fiber of the material, said fiber having transverse dimensions and a low-loss optical environment suitable for optical guiding of the beams at both of said frequencies $\omega_1$ and $\omega_2$.

8. In an optical communication system, apparatus according to claim 6 in which the body is a film of the material and the directing means include means for coupling said beams through a broad surface of said film.

9. An optical communication system according to claim 6 in which the sources of the beams have intensities $I_1$ and $I_2$, respectively, satisfying the relationship $I_1/\omega_1 < I_2/\omega_2$.

10. An optical communication system according to claim 6 in which the sources of the beams have intensities $I_1$ and $I_2$, respectively, satisfying the relationship $I_1/\omega_1 > I_2/\omega_2$.

11. In an optical communication system, optical modulation apparatus comprising a source of an intensity modulated optical beam at frequency $\omega_1$, a source of an unmodulated coherent optical beam at a frequency $\omega_2$ not equal to $\omega_1$, means including a body of material having two-photon absorption for respective photons of frequencies $\omega_1$ and $\omega_2$ for generating a photon having a frequency $\omega_3$ which is equal to the sum $\omega_1 + \omega_2$, said body of material having an energy transparency range greater than twice the photon energy of the modulated beam and less than the sum of the photon energies of the modulated and unmodulated beams and having absorption for photons of frequency $\omega_3$, a passive optical guide adjacent to said body, means for directing said beams into said guide with coincident intensities sufficient to produce significant two-photon absorption by evanescent wave coupling throughout a substantial pathlength in said body, and means for extracting from said guide for utilization a resultant intensity modulated beam at a frequency $\omega_2$.

* * * * *